United States Patent
Olanders et al.

[11] Patent Number: 5,943,323
[45] Date of Patent: Aug. 24, 1999

[54] ARRANGEMENT FOR REPEATERS IN A RADIO-BASED COMMUNICATIONS SYSTEM

[75] Inventors: Peter Olanders, Lomma; Johan Wickman, Bjarred, both of Sweden

[73] Assignee: Telia Ab, Fasta, Sweden

[21] Appl. No.: 08/716,282

[22] PCT Filed: Mar. 15, 1995

[86] PCT No.: PCT/SE95/00259
§ 371 Date: Nov. 22, 1996
§ 102(e) Date: Nov. 22, 1996

[87] PCT Pub. No.: WO95/26615
PCT Pub. Date: Oct. 5, 1995

[30] Foreign Application Priority Data

Mar. 29, 1994 [SE] Sweden .................. 9401050

[51] Int. Cl.⁶ .................. H04B 7/14; H04J 1/10
[52] U.S. Cl. .................. 370/315; 455/7
[58] Field of Search .................. 370/315, 279, 370/293, 294, 305, 312, 314, 321, 324, 329; 455/7, 54.1, 11.1, 13.1, 68, 73; 371/22, 30, 31–34, 41–45

[56] References Cited

U.S. PATENT DOCUMENTS

| | | |
|---|---|---|
| 4,744,083 | 5/1988 | O'Neill et al. .................. 371/22 |
| 5,133,080 | 7/1992 | Borras . |
| 5,150,361 | 9/1992 | Wieczorek et al. .................. 370/318 |
| 5,193,091 | 3/1993 | Crisler et al. .................. 370/318 |
| 5,319,635 | 6/1994 | Reed et al. .................. 370/279 |
| 5,365,590 | 11/1994 | Brame .................. 370/312 |

FOREIGN PATENT DOCUMENTS

| | | |
|---|---|---|
| 0515029 A1 | 11/1992 | European Pat. Off. . |
| WO 9209148 A1 | 5/1992 | WIPO . |
| WO 9414250 A1 | 6/1994 | WIPO . |
| WO 9417605 A1 | 8/1994 | WIPO . |
| WO 9508874 A1 | 3/1995 | WIPO . |

Primary Examiner—Huy D. Vu
Assistant Examiner—Chiho Andrew Lee
Attorney, Agent, or Firm—Oblon, Spivak, McClelland, Maier & Neustadt, P.C.

[57] ABSTRACT

For repeaters in a radio-based communication system, there is a function for identification and initiation of the respective repeater concerned. The said function can be effected without the need for digital decoding in the respective repeater concerned.

20 Claims, 3 Drawing Sheets

ARRANGEMENT FOR REPEATERS IN A RADIO-BASED COMMUNICATIONS SYSTEM

TECHNICAL FIELD

The present invention relates to an arrangement for repeaters in radio-based communications systems, for example systems of the DECT limited-area mobile access type, where a function or functions for identification and initiation is or are available for each respective repeater.

PRIOR ART

EP 497 490 relates to a cordless telecommunications system which is able to configure automatically the terminals included in the system. During installation, the base units are set out at random, after which an automatic configuration can take place by means of a simple press-button procedure. Some of the units can function as repeaters for other units. During communication (via such a repeater, for example), a transmission protocol consisting of transmission frames is used. At the start of each frame there is information for initiating the terminals with the aid of a synchronizing segment. At the start of the frame there is also the possibility of transmitting the identity of the system in order to check that the stations are communicating on the right system. Additional information which can be transmitted in the frame is information on which carrier frequency in to be used.

EP 515 029 describes a communications system which uses TDM. The system consists of a master station, a number of repeaters and slave stations. The master station can communicate with any one of the slave stations. During communication with the repeaters, a repeater number can be added to the synchronization information.

U.S. Pat. No. 4,230,989 shows a communications system with repeaters. The system consists of a central interrogating station and a number of remote stations. These stations can be identified by a unique address. If a first station cannot communicate directly with the central station, a second station in the vicinity can function as a repeater. A message addressed to the first station is then relayed onwards to the first station by the second station.

U.S. Pat. No. 5,200,955 describes a repeater which in intended to be used in a mobile radio system which employs TDMA. The repeater can identify which channels are active and can amplify these. However, the repeater cannot identify the channel or its user.

DESCRIPTION OF THE INVENTION
TECHNICAL PROBLEM

Repeaters in radio-based communications systems can be extremely important, in many applications, for the economy and functionality of the system. An example of a powerful repeater application is the radio-based local network application called limited-area mobile access. The application involves the terminating wire connection to the subscriber being replaced by or supplemented by radio covering the area. The subscriber is offered terminal mobility within one or more limited areas. In this application, if repeaters are used, the number of base units can be reduced by a factor of 10–100, for which reason the cost of, among other things, wire connection of the base units falls dramatically.

The potential importance of repeaters is further reinforced by the fast-growing worldwide interest within the sector.

Regardless of which repeater principle is used, certain common technical problems may occur, and these must be solved if it is to be possible to use repeaters successfully. The main object of the present invention is to propose an arrangement which solves these problems.

It is also important that the ideas lying behind the invention can be implemented in existing systems so that these can be used effectively and without the system capacity dropping. The invention also solves this problem.

In this connection there is therefore a need to propose novel repeater principles. A further technical problem in this connection is to propose a novel signalling procedure.

SOLUTION

The feature which can principally be regarded as characterizing the novel arrangement is that the said functions of identification and initiation for each repeater can be effected without the need for digital decoding in the respective repeater concerned.

Embodiments of the inventive concept involve identification of the operator, subscribers/users and/or functions pertaining to the system. The initiation entails initiation of repeaters, users and functions which are involved in the system at a given time. In one embodiment, each repeater is arranged to identify the operator affiliation of the base station. It is likewise indicated how the user in question identifies the operator affiliation of the repeater. In one embodiment according to the invention, the user unit can distinguish between traffic from the base station and the repeater. In addition, the base station can distinguish between traffic from the user unit coming via the repeater and coming directly. The repeater can moreover be allocated channels for the repeater/user unit communication. The repeater can also inform the base station that system errors have occurred in the repeater/the user unit. By using half time slots, full time slots and empty time slots, identification of the operator and repeater address and initiation of the unit/function in question can take place.

Further characteristics are evident from the patent claims attached.

ADVANTAGES

As a result of what has been proposed above, repeater functions can be used in associated radio-based communications systems, a fact which has considerable economic and functional potential for current systems and for future systems using TDMA. By means of the invention, it is possible to solve important problems regarding repeaters in TDMA systems.

DESCRIPTION OF THE FIGURES

A presently proposed embodiment of an arrangement which has the characteristics representative of the invention will be described hereinbelow with reference to the attached drawings, in which.

DETAILED DESCRIPTION

Explanation of some abbreviations which appear in the text:

BAS: Base Station (corresponds to Radio Fixed Part in the DECT specification).

CPP: Cordless Portable Part (the user unit).

REP: Repeater.

1. Identification and initiation relates to how the REP identifies the BAS operator affiliation. This is necessary if the REP is to repeat only BAS traffic from the desired operator.

2. The CPP identifies the REP operator affiliation, which is necessary if the CPP is not to reach the BAS via the wrong REP as regards operator affiliation.

3. The CPP distinguishes between traffic from the BAS and the REP, which is necessary for the REP principles which affect how time slots and/or time frames are used. The CPP must know which frame and time slot is to be used for uplink to the REP.

4. The BAS distinguishes between traffic from the CPP coming via the REP and, coming directly, which is necessary for the REP principles which affect how time slots and/or time frames are used. The BAS must know which frame and time slot is to be used for uplink from the REP.

5. The REP is allocated channels for REP-CPP communication. Channel allocation may be necessary in order to avoid neighbouring REPs interfering by repeating the same message on the same channel to the BAS or to the CPP.

6. The REP informs the BAS that system faults have occurred in the REP/CPP.

RIDIN (Repeater—IDentification and INitiation) according to the invention presupposes that the radio system uses the TDMA/TDD technique. The chief example of such a radio system is DECT. Other examples are PHP (Japan), DCT900 and Bellcore TDMA/TDD.

RIDIN consists of transmission of a consecutive sequence of TDMA time slots, which can have at least two possible states:

Full time slot

Empty time slot

RIDIN can additionally use the following states:

Part of the slot. This type has either the same start or endpoint as a full slot.

Carrier wave number for the time slot.

RIDIN presupposes that the receiver can measure whether a time slot in full (active) or empty (no transmission). RIDIN may also presuppose that the receiver can determine the carrier wave number. The receiver does not therefore need to execute a decoding of any digital information in the time slot.

RIDIN is accommodated within one time frame. RIDIN should only be transmitted in a time frame which (coincidentally) does not carry any duplex traffic. In this way, the capacity of the RIDIN system does not drop.

Figure 1:
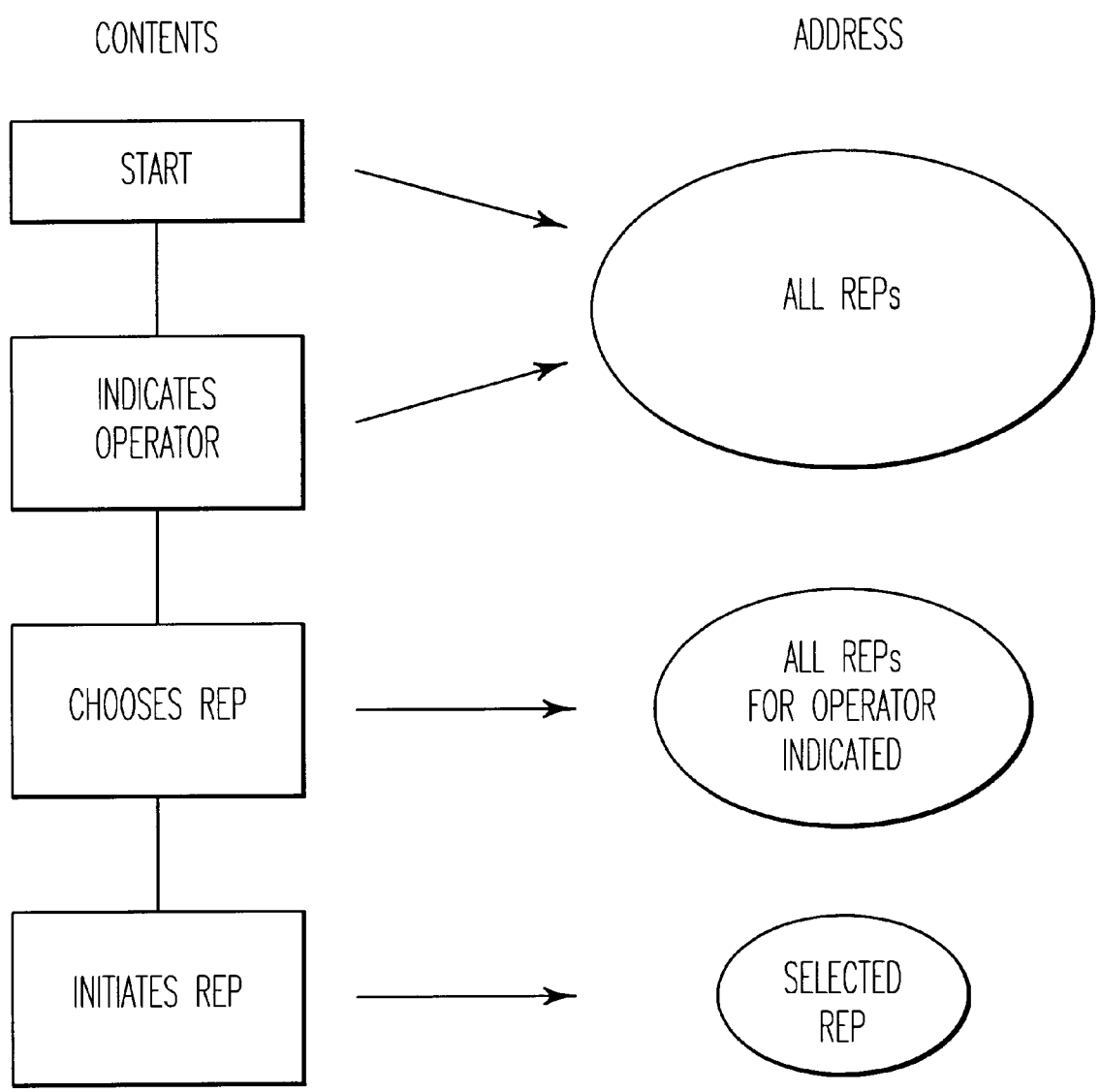
FIG. 1 shows the principle of an example of a radio-based system in the form of DECT limited-area mobile access with repeaters.

RIDIN has the structure according to FIG. 1:

Start message. Unique sequence which results in the REP interpreting the time slots as RIDIN.

Operator.

Which REP or REPs is/are covered by the initiation/allocation.

Initiation/allocation of, for example, frequency for the REP-CPP communication.

Figure 2:
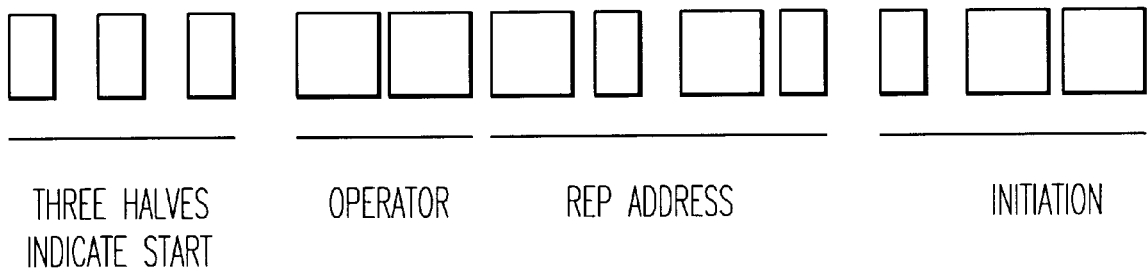
FIG. 2 shows, in block diagram form, a structure for identification and initiation according to the invention.

FIG. 2 shows an example of how it is possible to form RIDIN with 12 time slots (half the DECT time frame). In this example, the carrier wave information in not used. Despite this restriction, a great deal of information can be indicated: 9 different operators, 81 different REP addresses and 27 different initiations/-allocations.

RIDIN can thus be used to indicate the operator. If the REP belongs to the operator, then the REP chooses to be synchronized according to the existing frame structure. The CPP which receives communication from the BAS via the REP can decode and, among other things, determine whether the BAS (and with it the REP) belongs to the correct operator.

For system where each REP may use only certain carrier waves, RIDIN can thus be used for such carrier wave allocation. RIDIN moreover provides the possibility of some dynamics in the frequency allocation, since new allocation can take place, when required, without the REP needing manual adjustments which necessitate additional resources.

RIDIN can also be used by the REP in order to send information to the BAS. in this ease RIDIN has the same structure and can be used, for example, to send information on various types of REP status/system faults. In addition, a total REP system failure can be detected by the fact that a certain time between transmission of the REP status message is exceeded.

RIDIN can be used so that the CPP will know that it is in a REP system. If the CPP detects a RIDIN start sequence, then the CPP will use the frame cycle which the current repeater system requires.

The use of RIDIN say be appropriate in the following situations, inter alia:

Radio-based local networks which use repeaters.

The system for cordless company exchanges.

Public access.

In the above situations, the CT systems DCT900 and DECT can be used in the short term. Note that it may be entirely possible to use one and the same DCT900 portable or DECT portable (CPP) in all the above applications.

Figure 3:
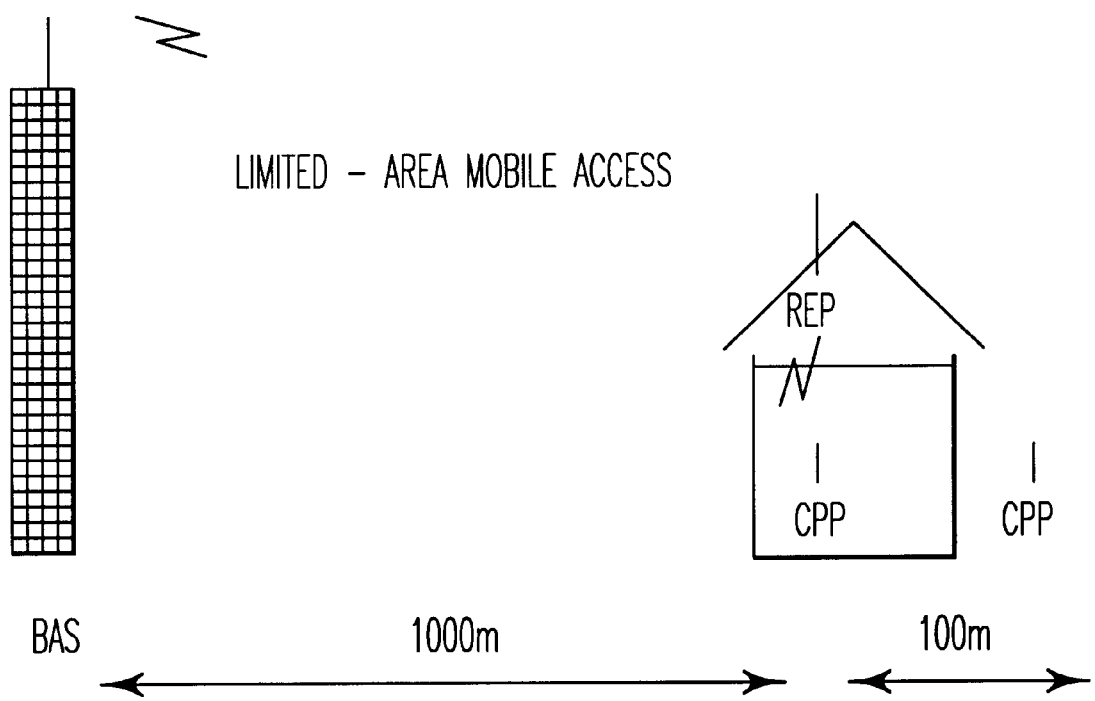
FIG. 3 shows, in the form of an explanatory diagram, how time slots and their configurations are used in connection with the identification and initiation functions.

FIG. 3 shows a base station, BAS, and user unit, CPP, and repeater, REP, in a DECT limited-area mobile access system.

We claim:

1. A radio-based mobile access communications system, comprising:
   a repeater having
      an input mechanism that receives a digital signal from a mobile station having a predetermined message content that is formatted in a predetermined format, said predetermined format including a time slot configured to hold respective portions of said digital signal,
      an output mechanism that transmits the digital signal to a base station, and
      means for interpreting the predetermined format without decoding the predetermined message content by measuring whether the time slot is a full time slot, a partially filled time slot, or an empty time slot so as to perform functions for identification and initiation of said repeater for relaying said digital signal from said mobile station to said base station.

2. The system of claim 1, wherein said functions for identification and initiation include functions for identification of at least one of an operator, subscriber/user, and function pertaining to the system.

3. The system of claim 1, wherein the functions for identification and initiation include functions used by the system upon initiation to initiate a repeating operation.

4. The system of claim 1, further comprising:
   another repeater, wherein each of said repeater and said another repeater being arranged to identify an operator affiliation of the base station, which is a precondition for only the repeater, but not the another repeater, for repeating base station traffic from the operator via the repeater.

5. The system of claim 1, further comprising:
   the mobile station, being a cordless portable unit that identifies an operator affiliation of the repeater, wherein a transmission from the cordless portable unit is prevented from reaching the base station via an incorrect repeater due to the operator affiliation.

6. The system according to claim 1, wherein:

said mobile station having a user unit that distinguishes between message traffic from the base station and the repeater, wherein as a precondition for determining how time slots and/or time frames are used, the mobile station checks on which frame and time slot can be used for an uplink to the repeater.

7. The system of claim 1, wherein:

the base station comprises means for distinguishing between traffic from the mobile station via the repeater and coming directly to the base station, which is a precondition for repeater principles that affect a use of time slots and/or time frames, the base station being aware of which frame and time slot is to be used for an uplink to the repeater.

8. The system of claim 1, wherein:

the repeater has allocated channels for repeater/user communication, a channel allocation being a precondition for avoiding neighboring repeaters interfering by repeating a same message on a same channel to the base station or the mobile station.

9. The system of claim 1, wherein:

said repeater is configured to inform the base station that system errors have occurred in at least one of the repeater and the mobile station.

10. The system of claim 1, wherein:

said predetermined format, being a TDMA/TDD format of at least one of a DECT system, a PHP system a DCT900 system and a Bellcore TDMA/TDD system.

11. The system of claim 1, wherein:

said repeater configured to transmit a consecutive sequence of TDMA time slots having at least one of the full time slot, the empty time slot, and the partially filled time slot, which has a same starting point or ending point as the full time slot and a carrier wave number for the time slot.

12. The system of claim 1, wherein:

said repeater is configured to determine a carrier wave number such that the repeater does not decode any of the predetermined message content in the time slot.

13. The system of claim 1, wherein:

identification and initiation data are transmitted in a time frame which does not also carry duplex traffic so as to reduce a capacity of the system.

14. The system of claim 1, wherein:

the identification and initiation functions operate with a start message representing a unique sequence and initiates the repeater to interpret time slots as identification and initiation functions, operator indication, indication of which repeater or repeaters are covered by an indication of initiation/allocation of frequency for repeater/user communication.

15. The system of claim 1, further comprising means for interpreting signals having half of a DECT time frame without using carrier information.

16. The system of claim 1, wherein:

said functions for identification and initiation designate an operator; and the repeater being configured to be synchronized according to a current frame structure when the mobile station receives a communication from the base station via the repeater and determines whether the base station and repeater belongs to a correct operator.

17. The system of claim 1, wherein:

the identification and initiation functions are used when the repeater and another repeater are used only for predetermined carrier waves and the identification and initiation function is for identifying the certain carrier waves; and said function for identification and initiation comprises means for allocating frequencies without the repeater needing manual adjustments that require additional resources.

18. The system of claim 1, wherein:

the identification and initiation function is used by the repeater to send information to the base station; and a total repeater system failure being detectable by a predetermined time being exceeded between adjacent transmissions of a repeater status message.

19. The system of claim 1, wherein:

the identification and initiation function are implemented to recognize that the mobile station is operating in a repeater-based system and the mobile station is configured to detect an identification/initiation function start sequence so that the mobile station uses a frame cycle used by a current repeater system.

20. The system according to claim 1, wherein:

the identification and initiation functions are used in a radio-based local network having at least one of multiple repeaters, systems for cordless company exchanges, and public access.

\* \* \* \* \*

UNITED STATES PATENT AND TRADEMARK OFFICE
CERTIFICATE OF CORRECTION

PATENT NO. : 5,943,323

DATED : August 24, 1999

INVENTOR(S): Peter OLANDERS, et al.

It is certified that an error appears in the above-identified patent and that said Letters Patent is hereby corrected as shown below:

On the title page, item [73], the assignee's city should be:

--Farsta, Sweden--

Signed and Sealed this

Third Day of April, 2001

*Attest:*

NICHOLAS P. GODICI

*Attesting Officer*  *Acting Director of the United States Patent and Trademark Office*